United States Patent [19]

Harada et al.

[11] 4,404,632
[45] Sep. 13, 1983

[54] ATTITUDE CONTROL SYSTEM FOR DRIVER'S SEAT

[75] Inventors: Kuniyoshi Harada, Takahama; Naofumi Fujie, Tokyo, both of Japan

[73] Assignee: Aisin Seiki Kabushiki Kaisha, Kariya, Japan

[21] Appl. No.: 235,173

[22] Filed: Feb. 17, 1981

[30] Foreign Application Priority Data

Mar. 31, 1980 [JP] Japan .................................. 55/41338

[51] Int. Cl.³ ........................ B60N 1/02; G06F 15/20
[52] U.S. Cl. .................................. 364/425; 296/65 R; 318/466; 364/706
[58] Field of Search ....................... 364/425, 715, 706; 296/65 R; 297/346; 318/466, 467

[56] References Cited

U.S. PATENT DOCUMENTS

| | | | |
|---|---|---|---|
| 3,597,554 | 8/1971 | Siegal | 318/466 X |
| 3,626,130 | 12/1971 | Siegal | 318/466 X |
| 3,979,058 | 9/1976 | Katz et al. | 364/706 |
| 4,037,092 | 7/1977 | Osborne et al. | 364/706 |
| 4,204,255 | 5/1980 | Cremer | 364/425 |

*Primary Examiner*—Edward J. Wise

*Attorney, Agent, or Firm*—Sughrue, Mion, Zinn, Macpeak, and Seas

[57] ABSTRACT

An attitude control system for driving and controlling an attitude controlling mechanism associated with a driver's seat. A semiconductor read-only memory stores attitude establishing standard data corresponding to values of a physical stature and an input/output controlling program data associated with a microcomputer. When a value of the stature is inputted into the microcomputer from a keyboard, the microcomputer reads attitude establishing standard data which corresponds to the stature value inputted from the semiconductor read-only memory, and controls the energization of the attitude controlling mechanism until an attitude indicated by such data is reached. An adjustment of the attitude is possible by a key operation. Data representing the prevailing attitude of the attitude controlling mechanism can be stored in a non-volatile semiconductor memory in association with a driver identification code. When an identification code is inputted, the microcomputer reads attitude data from the non-volatile semiconductor memory and controls the energization of the attitude controlling mechanism until an attitude indicated by such data is reached.

7 Claims, 12 Drawing Figures

ATTITUDE CONTROL SYSTEM FOR DRIVER'S SEAT

BACKGROUND OF THE INVENTION

The invention relates to a driver's seat in a vehicle.

A driver who drives a vehicle normally operates a steering wheel, an accelerator and/or brake pedal, a transmission and a number of switches in accordance with the traffic conditions, weather and road marks. It will be noted that the operating ends of these members or components are fixed in position while the physical features of the driver vary from driver to driver. Accordingly, a driver's seat is arranged to permit an adjustment of the forward or rearward movement, the elevation, the inclination and the cushioning to his preference. It will be understood that a single vehicle may be utilized by a plurality of drivers. Also, when a single driver is driving the vehicle, it may be desirable to adjust the attitude of the seat as he becomes tired or as the road condition varies such as a down or an up grade or a turning point. However, it is cumbersome to adjust the seat manually or each time a driver gets on the vehicle.

Recently, there has been a proposal to install a microcomputer on the vehicle for storing data indicative of the physical features so that a desirable seat attitude data can be derived by an arithmetic operation, allowing the driver to read the attitude data to operate a positioning apparatus. In an alternative arrangement, the positioning apparatus is associated with position sensors and a manual positioning apparatus so that when the manual apparatus is operated to adjust the attitude, data from the position sensors may be stored in a microcomputer in correspondence to an identification code. Later, the identification code may be inputted into the microcomputer, whereupon the attitude of the seat is established in accordance with the corresponding data stored.

In the former arrangement, the driver adjusts the attitude of the seat by reading data which is derived by a usual computer or adjusts the attitude of the seat automatically in accordance with the computer output, and hence the attitude of the seat is fixed in accordance with the physical features of the driver and the operating program, making it impossible or difficult to change the attitude from time to time and in accordance with the intent of a driver. It will be almost impossible to formulate an operating program which satisfies every driver.

In the latter arrangement, the seat attitude is automatically established by entering the identification code once the driver has previously established the seat attitude to his preference and data indicative of such attitude is stored into the microcomputer in association with his identification code. However, the storage of optimum data is essential in this arrangement, and an unexperienced driver or a driver who fails to realize his optimum attitude may produce an entry of unreasonable attitude, presenting difficulty in the establishment of optimum data.

SUMMARY OF THE INVENTION

It is a first object of the invention to provide an attitude control system for driver's seat capable of automatically establishing an appropriate attitude in accordance with the entry of data corresponding to the physical features of a driver and in which the data can by subsequently changed.

A second object is to provide an attitude control system for driver's seat in which once data indicative of a desired attitude of the seat is stored in a memory, the desired attitude is automatically established in response to the entry of an identification code of the driver.

The above objects are achieved in accordance with the invention by storing in a semiconductor memory standard data used for establishing the attitude in accordance with the physical features, and entering data indicative of the physical features of a driver into a microcomputer to read one of standard data which corresponds thereto, thereby allowing the attitude of the seat to be automatically established. The attitude of the seat can be changed in response to a manual switch operation and/or key operation. The attitude of the seat which has been established is stored in a non-volatile semiconductor memory in corresponding relationship with an identification code. Whenever the identification code is inputted, the corresponding attitude data stored in the non-volatile memory is read out, thereby allowing the attitude represented by such data to be automatically established.

As a result of such arrangement, an unexperienced driver is capable of automatically establishing the seat at its standard attitude assigned to that particular driver in response to the entry of data indicative of his physical features, thus preventing an unreasonable attitude from being established. In addition, after the standard attitude is established, a switch operation and/or key operation permits the attitude to be changed to the preference of the driver. When the driver frequently uses the vehicle, the attitude data which has been previously changed is stored in the microcomputer in response to the entry of his identification code and the memory specified by the particular key, and is subsequently read out in response to the identification code, allowing the attitude which has once been established and changed to be automatically established.

In this manner, for the initial time, the seat is established at standard attitude which corresponds to the physical features of a particular driver. Hence, a passable attitude of the seat is initially established for an unexperienced driver. Subsequently, a switch operation and/or key operation permits the attitude of the seat to be further changed. If the seat is to be established at the same attitude on the next chance, an identification code is assigned and a key is operated to store the data, whereupon the data indicative of the attitude of the seat is stored in the non-volatile memory, permitting such attitude to be automatically established in response to a subsequent entry of the identification code. In this manner, the establishment of the seat attitude initially takes place utilizing standard data sotred in the microcomputer and can be adjusted by the driver at will subsequently. The desired attitude of the seat can be stored in the memory by a key operation. Subsequently, the entry of the identification code is all that is required to establish the seat at the attitude corresponding to the stored data, in an automatic manner. The stored data can be simply changed.

BRIEF DESCRIPTION OF THE DRAWINGS

FIG. 4b is a cross section taken along the line IVB—IVB in FIG. 4a;

DESCRIPTION OF A PREFERRED EMBODIMENT

Figures 1, 2:
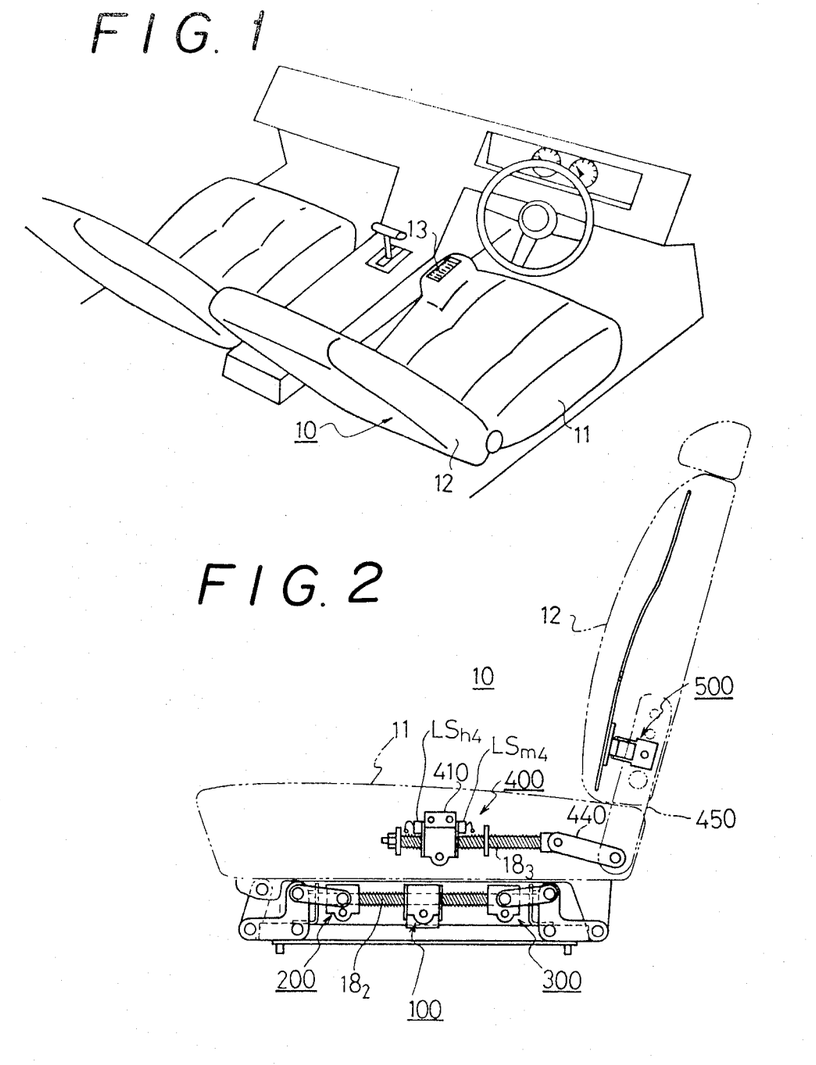
FIG. 1 is a perspective view illustrating the appearance of one embodiment of the invention.
FIG. 2 is a side elevation of an attitude controlling mechanism as mounted on the seat shown in FIG. 1.

Referring to FIG. 1 which shows the appearance of one embodiment of the invention in perspective view, a driver's seat 10 is formed by a seat body 11 and a seat back 12 which is angularly movable with respect thereto. An operating board 13 is fixedly mounted on the seat body 11. An attitude controlling mechanism which is mounted on the seat body 11 and the seat back 12 is schematically illustrated in FIG. 2. In the example shown, the attitude controlling mechanism includes a seat forward/reverse drive mechanism 100 which causes a seat base supporting the seat body 11 to slide in the forward or reverse direction with respect to a base frame which is fixedly mounted on the floor of a vehicle, a seat front elevation adjusting mechanism 200 which elevates or lowers the front of the seat base, a seat rear elevation adjusting mechanism 300, a seat back tilting mechanism 400 pivotally mounted on the seat base for adjusting the angle of inclination of the seat back with respect to the frame, and a seat back cushion adjusting mechanism 500 which adjusts the spring cushion contained in the seat back. The combination of the seat front and the seat rear elevation adjusting mechanism 200, 300 determines the inclination of the seat body 11, and thus defines a seat base tilting mechanism.

Figure 3:
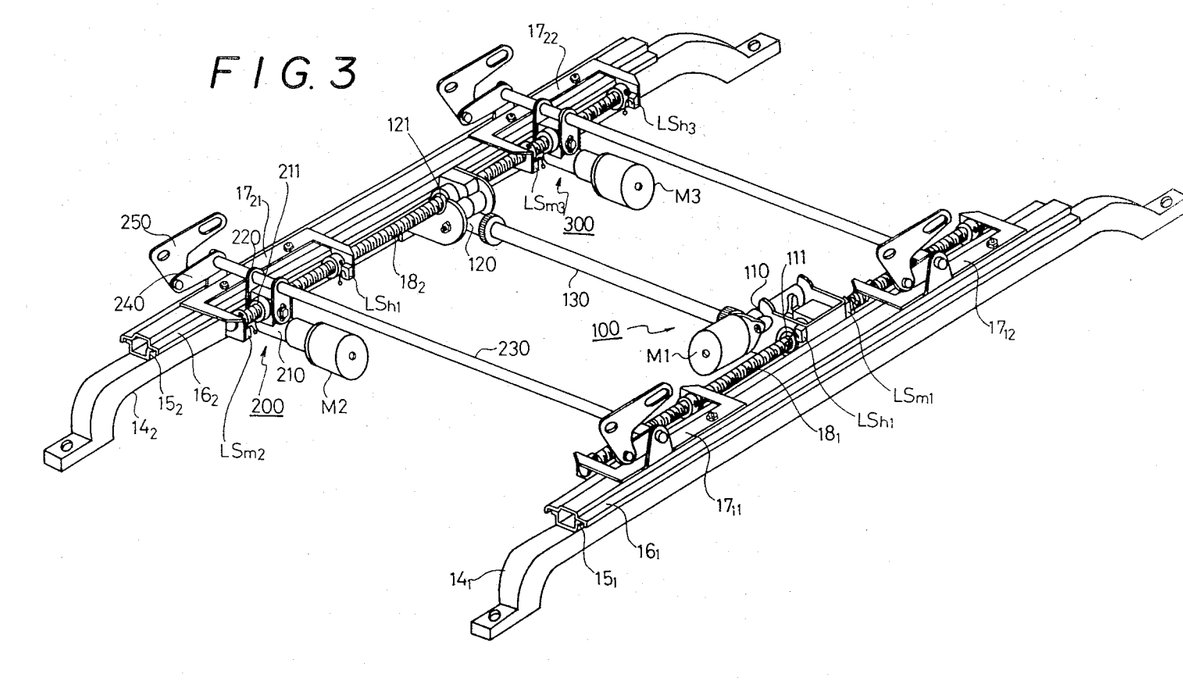
FIG. 3 is a perspective view of another mechanism located below the seat base shown in FIG. 1.

The mechanism located below the seat base which supports the seat body 11 is shown in FIG. 3. In this Figure, a pair of base frames $14_1$, $14_2$ are secured to the floor of the vehicle, and a pair of lower rails $15_1$, $15_2$ are fixedly mounted thereon. A pair of upper rails $16_1$, $16_2$ slidably rest on the lower rails $15_1$, $15_2$, respectively. A pair of arms $17_{11}$, $17_{12}$ are fixedly mounted on the upper rail $16_1$ while a pair of arms $17_{21}$, $17_{22}$ are fixedly mounted on the upper rail $16_2$. The arms $17_{11}$, $17_{12}$ fixedly carry a threaded bolt $18_1$ while the arms $17_{21}$, $17_{22}$ fixedly carry another threaded bolt $18_2$.

The threaded bolts $18_1$, $18_2$ threadably engage nut units 110, 120, respectively, which are fixedly mounted on the base frames $14_1$, $14_2$, respectively. The both nut units 110, 120 constitute together the seat forward-/reverse drive mechanism 100, and includes a pair of nuts 111, 121 each having a threaded bore formed therein which is engaged by an associated one of the threaded bolts $18_1$, $18_2$, and having teeth formed around its outer periphery, and worm gears meshing with the nuts 111, 121, respectively. These worm gears are coupled together by a flexible shaft 130. In the unit 110, a bevel gear is fixedly mounted on the shaft on which the worm gear is mounted and meshes with another bevel gear which is fixedly mounted on the shaft of a motor M1. Since these units 110, 120 are secured to the respective base frames $14_1$, $14_2$, it will be seen that when the motor M1 is energized for rotation, the inner shaft of the flexible shaft 130 rotates to cause a rotation of the worm gear, thus rotating the meshing nuts 111, 121 which in turn forward the threaded bolts $18_1$, $18_2$, respectively. Since the threaded bolts $18_1$, $18_2$ are secured to the upper rails $16_1$, $16_2$ through the arms $17_{11}$, $17_{12}$, $17_{21}$ and $17_{22}$, a movement of the upper rails $16_1$, $16_2$ occurs. In this manner, the rotation of the motor M1 in the forward or reverse direction causes a sliding movement of the upper rails $16_1$, $16_2$ either forwardly or reversely with respect to the lower rails $15_1$, $15_2$.

The seat front elevation adjusting mechanism 200 includes a nut unit 210 constructed in the same manner as the unit 120, a motor M2, a rocking arm 220, a rod 230 integrally secured to the arm 220, a link arm 240 integrally secured to the rod 230, and a base arm 250 pivotally connected with the link arm 240 and to which the seat base (not shown) is fixedly connected. A rotation of the motor M2 in the forward or reverse direction causes the nut unit 210 to move either forwardly or reversely along the threaded bolt $18_2$, thereby turning the rod 230 and the link arm 240 clockwise and counterclockwise, respectively, to thereby move the base arm 250 in the vertical direction.

Figure 4A:
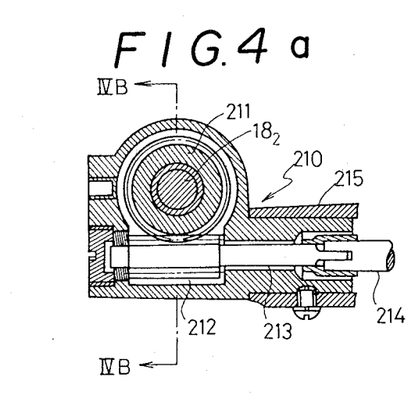
FIG. 4a is a cross section of the nut unit shown in FIG. 3, taken in a direction perpendicular to a threaded bolt.
Figure 4B:
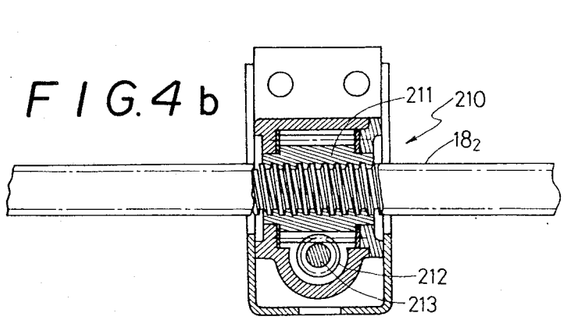
Figure 4C:
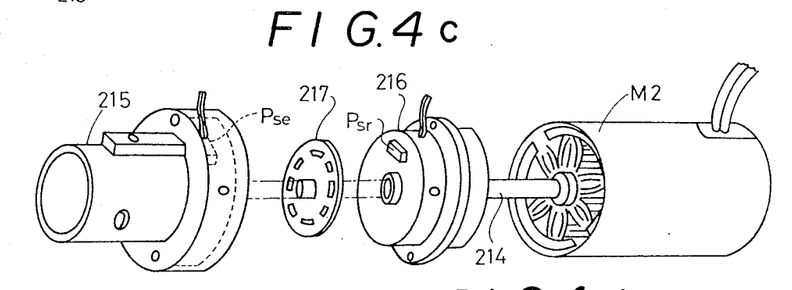
FIG. 4c is an enlarged perspective view of the coupling between the motor and the nut unit.
Figure 4D:
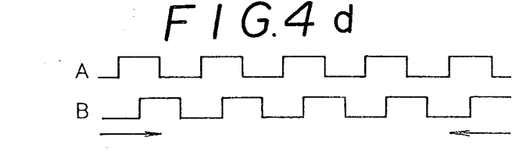
FIG. 4d graphically illustrates the waveform of an output signal from the phototransistor unit shown in FIG. 4c.

FIG. 4a is an enlarged cross section of the nut unit 210 through a plane including the rod 230 while FIG. 4b shows a section thereof taken along the line IVB—IVB. In these Figures, the nut is shown at 211 which meshes with a worm 212 mounted on a worm shaft 213 which is coupled with a motor shaft 214. FIG. 4c shows, in exploded perspective view, the coupling between the motor M2 and the nut unit 210. The motor M2 includes an end plate 216 on which a phototransistor unit $P_{sr}$, representing a photocoupler, is fixedly mounted. A rotary slitted disc 217 is fixedly mounted on the motor shaft 214, and a light emitting unit $P_{se}$ of the photocoupler is fixedly mounted on a fixing sleeve 215 in opposing relationship with the phototransistor unit $P_{sr}$ with the slitted disc 217 interposed therebetween. Consequently, when the motor M2 is fixedly mounted on the nut unit 210 as shown in FIG. 3, signals A and B of waveforms as shown in FIG. 4d are developed by the phototransistor unit $P_{sr}$ as the motor M2 rotates in the forward or reverse direction. These signals A, B are used to detect the direction of rotation of the motor M2 and to detect the attitude and the position, as will be further described later. It is to be understood that each of the motors M1, M2 described above as well as motors M3 to M5 to be described later is associated with a slitted disc and a sensor unit $P_{se}$, $P_{sr}$ to produce a pair of signals A, B from each motor unit.

The seat rear elevation adjusting mechanism 300 is constructed in quite the same manner as the mechanism 200, and therefore will not be described in detail.

The seat back tilting mechanism 400 is generally similar to the seat forward/reverse drive mechanism and includes a nut unit and a motor M4. Referring to FIG. 2 for describing it, it includes a nut unit 410 which is secured to the seat base (not shown, but is fixedly mounted on a member 250). A threaded bolt $18_3$ threadably engages the nut unit 410, and has its one end pivotally connected to one end of a link arm 440, the other end of which is pivotally connected to a seat back arm 450 which is in turn fixedly mounted on the seat back frame. As the motor M4 rotates either forwardly or reversely, the seat back 12 is turned either clockwise or counter-clockwise.

Figure 5:
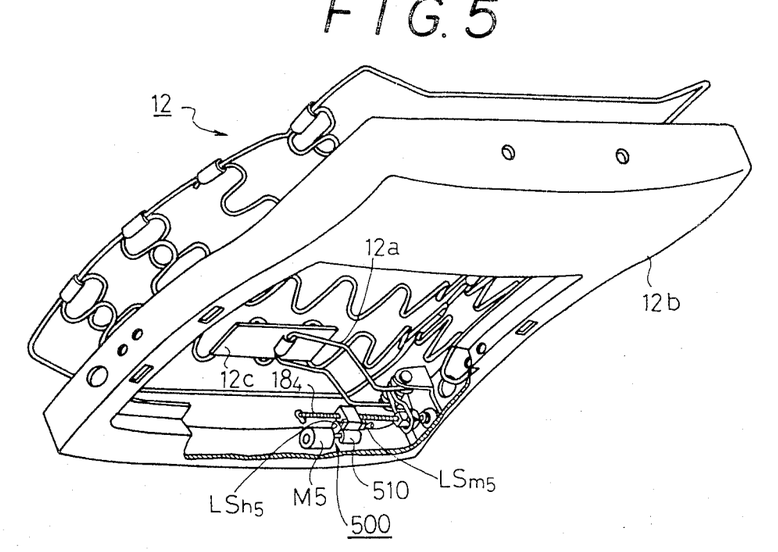
FIG. 5 is an exploded perspective view of the seat back shown in FIG. 1.

Referring to FIG. 5, the seat back 12 includes a torsion spring 12a, the resilience of which is adjusted by the seat back cushion control mechanism 500. Specifically, a nut unit 510 is fixedly mounted on the seat back frame 12b, and is threadably engaged by a threaded bolt $18_4$, one end of which is coupled to one end of the torsion spring 12a. By rotating the motor M5 either forwardly or reversely, the threaded bolt translates to the left or right, whereby a lumber plate 12c coupled to the other end of the torsion spring 12a advances or retracts.

The five mechanisms which are used to establish a desired attitude include limit switches $LS_{h1}$–$LS_{h5}$ and $LS_{m1}$–$LS_{m5}$ which are located at the standby (or home) position and the maximum travel (limit position) and which are closed as a movable member moves close thereto.

Figure 6:
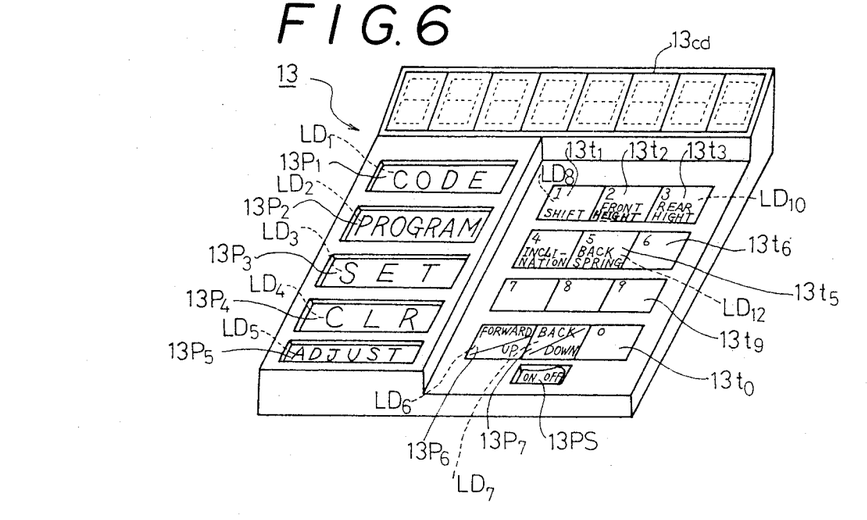
FIG. 6 is an enlarged perspective view of an operating board shown in FIG. 1.

FIG. 6 shows an enlarged perspective view of the operating board 13. The operating board 13 is provided with eight digit 7-segment displays $13_{CD}$, operation keys $13_{P1}$–$13_{P7}$, ten keys $13t_0$–$13t_9$ and a keyboard power switch $13_{PS}$. Light emitting diodes $LD_1$–$LD_{12}$ are mounted on the inside of the individual key buttons of the operation keys $13_{P1}$–$13_{P7}$ and the ten keys $13t_1$–$13t_5$.

Figure 7:
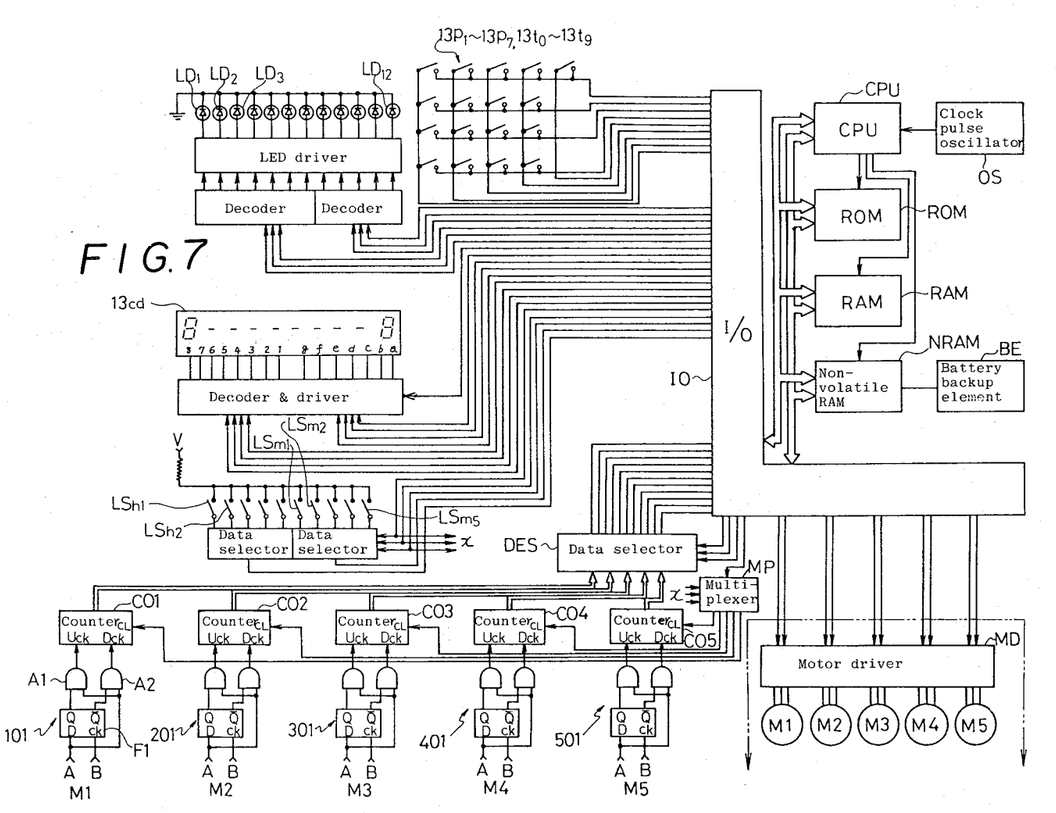
FIG. 7 is a block diagram illustrating the interconnection between electrical elements mounted on the operating board.

FIG. 7 shows a block diagram of electrical elements which are mounted on the operating board. However, it is to be understood that the power bus is omitted from illustration. The principal component is a microcomputer which comprises a central processing unit CPU, a semiconductor read-only memory ROM, a semiconductor read-write memory RAM, a non-volatile read-write semiconductor memory NRAM, a clock pulse oscillator OS, a battery backup element BE, an input/output port I/O, a data bus and an address bus. Connected to the input/output port I/O are the switch terminals of the operation keys $13_{P1}$–$13_{P7}$ and the ten keys $13t_0$–$13t_9$, a decoder associated with a circuit which energizes the light emitting diodes $LD_1$–$LD_{12}$, a circuit which energizes the character displays $13_{cd}$, a multiplexer which reads the limit switches $LS_{h1}$–$LS_{h5}$ and $LS_{m1}$–$LS_{m5}$, a data selector DES, a multiplexer MP and a motor energizing circuit MD. A count code from five up/down counter CO1–CO5 is supplied to the data selector DES, and these counters are cleared by an output from the multiplexer MP.

Each of the counters CO1–CO5 has a pair of pulse inputs which are connected with one of up-down circuits 101–105. The up-down circuit 101 includes a D flipflop F1 which is set as a CK input changes from the low or "0" to "1" level when a D input is high or at "1" level and which is reset as the CK input changes from "0" to "1" level when the D input is "0." The circuit 101 also includes an AND gate A1 which receives the Q output of the flipflop F1 and the signal A and which has its output connected to the up count input of the counter CO1, and another AND gate A2 which receives the Q output of the flipflop F1 and the signal A and which has its output connected to the down count input of the counter CO1. When the motor M1 rotates in the forward direction, the signal A is applied as a count pulse to the up count input of the counter CO1 while when the motor M2 rotates in the reverse direction, the signal A is applied as a count pulse to the down count input of the counter CO1. In this manner, a count in the counter CO1 represents the seat advanced position referenced to the home position. Other circuits 202 to 205 are similarly constructed as the counter 201. It will be understood that the count in the counters CO2–CO5 represents the elevation of the seat front, the elevation of the seat rear, the inclination of the seat back and the resilience of the seat back cushion (or the position of the lumber plate 12c), respectively.

Stored in the ROM of the microcomputer are program data which detects the closure of a switch contact in response to the depression of one of keys $13_{P1}$–$13_{P7}$ and $13t_0$–$13t_9$, program data which latches one of the light emitting diodes illuminated which corresponds to the depressed key, display program data for indicating the key number on the display $13_{CD}$, program data which controls the read or write operation from the NRAM, an arithmetic operation and the energization of the motors M1 to M5 in response to a key operation, and a variety of constants data. The most significant one of the constants data is attitude standard data. The operation of the microcomputer based on these data can be summarized as follows.

(a) When the key $13_{P1}$ "CODE" is depressed followed by a three digit ten key input indicative of the stature in centimeters, standard data which corresponds to the ten key input is read from the ROM, and corresponding attitude data (in the form of a count code in the counters CO1–CO5) is written into the RAM at a given address (attitude data zone). As the key $13_{P3}$ "SET" is depressed, the mechanisms 100 to 500 are preset to positions which are indicated by the attitude data stored in the RAM. When these mechanisms are preset, the data in the counters CO1–CO5 is written into the attitude data zone of the NRAM.

(b) When the key $13_{P5}$ "ADJUST" is depressed, followed by the depression of the key $13t_1$ "SHIFT," the attitude control mechanism 100 is specified. When the key $13t_3$ "FRONT HEIGHT" is depressed, the mechanism 200 is specified. When the key $13t_3$ "REAR HEIGHT" is depressed, the mechanism 300 is specified. When the key $13t_4$ "INCLINATION" is depressed, the mechanism 400 is specified. Finally, when the key $13t_5$ "BACK SPRING" is depressed, the mechanism 500 is specified. The specified mechanism is driven in the forward direction (in a direction from the home position toward the limit position) as long as the key $13_{P6}$ "FORWARD/UP" is held depressed, and is driven in the reverse direction as long as the key $13_{P7}$ is held depressed.

(c) When the key $13_{P2}$ "PROGRAM" is depressed, an unregistered identification code (one of No. 1–No. 8 which is not yet registered in the NRAM) is indicated on the display $13_{CD}$ together with "PE." When there is a ten key input (one digit, for example, 3) under this condition and the key $13_{P3}$ "SET" is depressed, the count code in the counters CO1–CO5 is stored in the registered data zone and the attitude data zone of the NRAM assigned to the identification code (No. 3). In the absence of an unregistered identification code, the characters "PF" are attached in the manner of "PF345678." In this example, the identification codes are chosen as from No. 1 to No. 8, it will be understood that No. 1 and No. 2 are allocated to principal drivers to prevent them from appearing in either unregistered indication "PE . . . " and registered indication "PF . . .

."  However, the registering or rewriting of No. 1 and No. 2 can be achieved in the similar manner as No. 3 to No. 8.

(d) When one of the ten keys $13t_1$–$13t_8$ is initially depressed, it is recognized as an identification code input. When the key $13_{P3}$ "SET" is then depressed, the attitude data corresponding to the number of the inputted identification code is read from the registered data zone of the NRAM and is written into the attitude data zone of the RAM. The mechanisms 100 to 500 are preset to positions which are instructed by the attitude data. When these mechanisms are preset, the data in the counters CO1–CO5 is stored in the attitude data zone of the NRAM.

(e) The current attitude data is written into the attitude data zone of the NRAM while the target attitude data is written into the attitude data zone of the RAM. Consequently, when the power is turned off on the operating board 13, the power supply to the various circuits shown in FIG. 7 except the NRAM is turned off, whereby the count code is the counters CO1–CO5 is cleared. However, the data which indicates the current attitude is retained in the attitude data zone of the NRAM, and the attitude data in association with the identification code is retained in the NRAM. Consequently, when the power is turned on again, the prevailing attitude is indicated by the attitude data in the NRAM. If an identification code which requires another attitude is inputted, the attitude data which is registered in the NRAM in association with the identification code is read out into the RAM and is defined as a target data. When the key $13_{P3}$ "SET" is depressed, the mechanisms 100 to 500 are driven to the target positions while maintaining reference to the current attitude data (the attitude data zone in the NRAM). When the mechanisms are driven to the target positions, the data in the counters CO1–CO5 is entered into the attitude data zone of the NRAM.

(f) During the time the mechanisms 100 to 500 are driven, if the location of the limit switches $LS_{h1}$–$LS_{h5}$ (home positions) and $LS_{m1}$–$LS_{m5}$ (limit positions) is reached, the drive is interrupted. When the limit switches $LS_{h1}$–$LS_{h5}$ are closed, the corresponding counters CO1–CO5 are cleared, thus making a revision of the values which indicate the detected positions.

(g) The standard attitude data (the constants data in the ROM) cover twelve values of the physical stature from 140 cm to 195 cm in increment of 5 cm. Each value of the physical stature is formed by five codes corresponding to the count data in the counters CO1–CO5. In this manner, the physical feature is figured in terms of the physical stature. By inputting the physical stature by means of the ten keys, the read-out of the standard attitude data or a calculation is made. If the stature input is equal to 140, 175 or 180, corresponding attitude data is read from the ROM and then stored in the RAM. However, if the input is equal to 167, an interpolation is made by adding to the data corresponding to the physical stature of 165 a value which is equal to the data corresponding to the stature of 170 minus the data corresponding to the stature of 165 multiplied by 2/5 and rounding off figures less significant than the floating point. The resulting value is stored in the attitude data zone of the RAM.

Figure 8A:
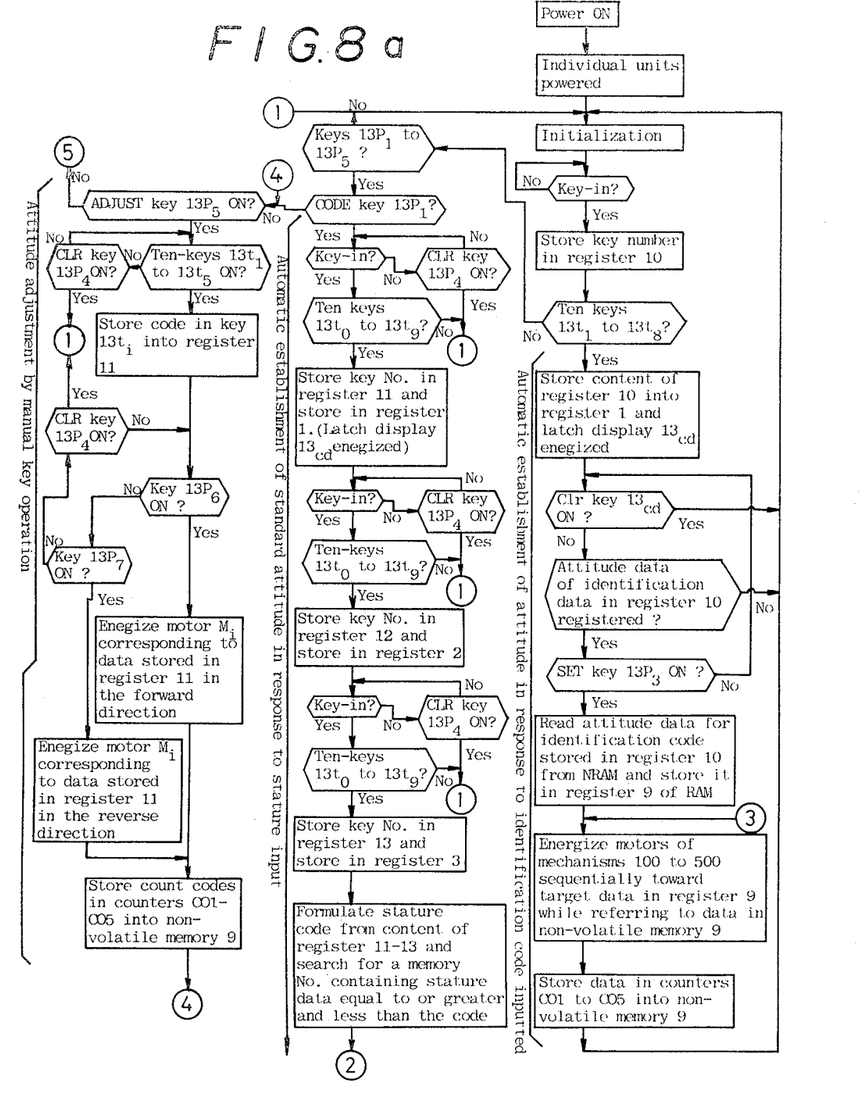
FIGS. 8a and 8b are flowcharts generally illustrating the operation of the microcomputer shown in FIG. 7.
Figure 8B:
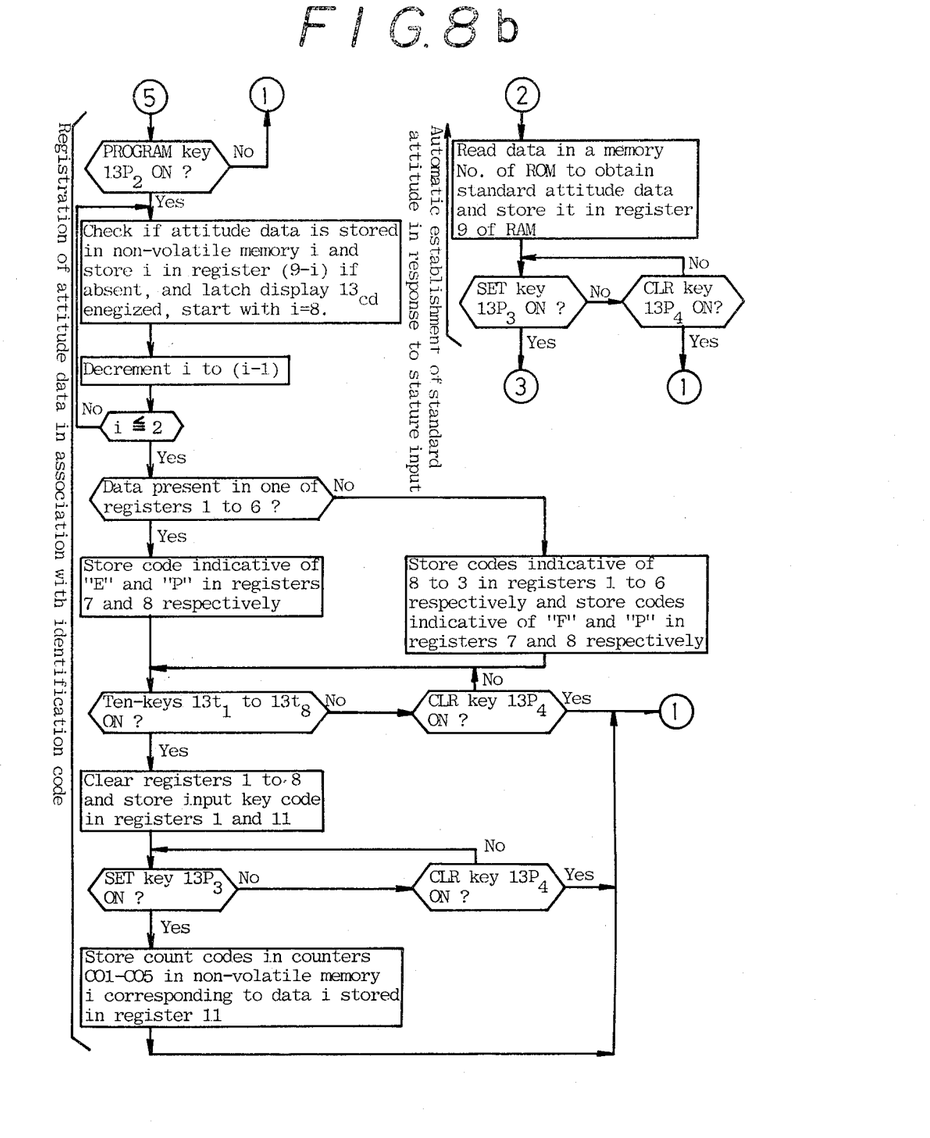

FIGS. 8a and 8b show flowcharts for operating the microcomputer. It is to be understood that in these flowcharts, the constants data storing zones of the ROM are referred to as memory 1, memory 2, ... while the storing zones of the NRAM are referred to as nonvolatile memory 1, 2, .... The storing zones of the RAM are referred to as the registers. Principal contents of these memories are indicated below.

TABLE 1

| Memories in the ROM | |
|---|---|
| Memory Zone | Memory Content |
| Memory 1 | attitude data (in 5 codes) corresponding to stature of 140 cm |
| Memory 2 | attitude data (in 5 codes) corresponding to stature of 145 cm |
| Memory 3 | attitude data (in 5 codes) corresponding to stature of 150 cm |
| . | . |
| . | . |
| Memory 12 | attitude data corresponding to stature of 195 cm |

TABLE 2

| Memories in the NRAM | |
|---|---|
| Memory Zone | Memory Content |
| non-volatile memory 9 (attitude register) | current attitude data (in 5 codes) |
| non-volatile memory 1 | attitude data for identification code No. 1 (in 5 codes) |
| non-volatile memory 2 | attitude data for identification code No. 2 (in 5 codes) |
| . | . |
| . | . |
| non-volatile memory 8 | attitude data for identification code No. 8 (in 5 codes) |

TABLE 3

| Memories in the RAM | |
|---|---|
| register 9 (attitude register) | attitude data (in 5 codes) read from NRAM and ROM |
| register 1 | first digit of data displayed on display $13_{CD}$ |
| register 2 | second digit of data displayed on display $13_{CD}$ |
| . | . |
| . | . |
| register 8 | eighth digit of data displayed on display $13_{CD}$ |
| register 10 | temporary data |
| register 11 | temporary data |
| register 12 | temporary data |

Referring to FIGS. 8a and 8b, a manupulation by the driver and a corresponding operation of the microcomputer will now be described. Initially the power switch 13PS is turned on to energize the microcomputer. The microcomputer is adapted to turn on the power to the various circuits connected therein in a given sequence and to clear memories in the internal RAM and the external RAM of CPU as well as I/O latches (initialization). It then waits for a key input. The establishment of a standard attitude (the central branch of FIG. 8a and a branch shown in FIG. 8b which is connected thereto) will be described first. When the driver depresses the key $13_{P1}$ "CODE," the microcomputer latches the light emitting diode corresponding to that key in its illuminated condition and stores the on condition of the key $13_{P1}$. The latching of the diode and the storage of the on condition of the key $13_{P1}$ are maintained until another one of the keys $13_{P2}$ to $13_{P5}$ is turned on. The microcomputer waits for an input from the ten keys $13t_0$–$13t_9$, and whenever a three digit input indicative of the stature in units of centimeters is applied, it displays them on the display $13_{CD}$ in the sequence of inputted digits. Assume now that an input is equal to 167. In this instance, data in the memory 6 of the ROM (5 codes representing the standard attitude for the stature of 165 cm) is stored in the register 14 while the data in the memory 7 of the ROM (5 codes representing the standard attitude for the stature of 170 cm) is stored in the register 15, and the standard attitude code for the stature of 167 cm is calculated for each corresponding code by interpolation, with result stored in the register 9. When the driver turns the key $13_{P3}$ "SET" on, the storage of the on condition of the key $13_{P1}$ is cleared and the latch associated with the illuminating diode is deactivated while storing the on condition of the key $13_{P3}$ and latching the corresponding light emitting diode in its illuminated condition. The mechanisms 100 to 500 are sequentially energized under control. During such control, assuming that the data stored in the non-volatile memory 9 of the NRAM which indicates the current position of the mechanism 100 is equal to 120 while the target data for the mechanism 100 which is stored in the register 9 is equal to 150, the difference $150 - 120 = 30$ is obtained. Since the difference is of positive polarity, the motor M1 is energized to rotate in the forward direction. The limit switches $LS_{h1}$, $LS_{m1}$ and the count in the counter CO1 are monitored until the count in the counter CO1 becomes equal to 150, whereupon the rotation of the motor M1 in the forward direction is interrupted or stopped. Assuming that the data in the non-volatile memory 9 is equal to 200 while the data in the register 9 is equal to 100, the difference $100 - 200 = -100$ is obtained. Since it is of a negative polarity, the motor M1 is energized to rotate in the reverse direction, and the rotation of the motor M1 in the reverse direction is interrupted or stopped when the count in the counter CO1 becomes equal to 100. When the limit switch $LS_{m1}$ is turned on during the rotation of the motor in the forward direction, such rotation is interrupted and is inhibited as long as the limit switch remains on. When the limit switch $LS_{h1}$ is turned on, the rotation in the reverse direction is interrupted and is inhibited as long as the limit switch remains on. The counter CO1 is cleared when the limit switch is turned on. Such arithmetic operation under the control of energization of the motor is sequentially performed with respect to the motors M1 to M5, and when such control has been completed, all of the registers are cleared or initialized, returning to a key input standby mode. In this manner, by inputting the physical stature and depressing the "SET" key, the seat 10 is automatically established at its standard attitude which corresponds to the stature.

Referring to the left-hand branch of the flowchart shown in FIG. 8a, a manual adjustment will now be described. When the driver depresses the key $15_{P5}$ "ADJUST," the storage of the on condition of other keys $13_{P1}-13_{P4}$ and the latching of diodes are terminated. Instead the on condition of the key $13_{P5}$ is stored and the corresponding light emitting diode is latched in its illuminated condition, and the system waits until the ten keys $13t_1-13t_5$ are turned on. When the key $13t_1$ is turned on while the on condition of "ADJUST" key $13_{P5}$ is stored, the motor M1 is specified. In the similar manner, the motors M2 to M5 are specified when the keys $13t_2$ to $13t_5$, respectively, are turned on. Such condition is stored in the register 11, and the corresponding light emitting diode is latched in its illuminated condition while waiting for the key $13_{P6}$ or $13_{P7}$ to be turned on. If the key $13_{P6}$ is turned on, the light emitting diode which corresponds to that key is energized for illumination only during the time the key is maintained on, and one of the motors (M1 to M5) which is specified by the data stored in the register 11 is energized for rotation in the forward direction. If the motor M1 is energized at this time, the limit switch $LS_{mi}$ is monitored until it is turned on, whereupon the rotation in the forward direction is interrupted. Otherwise the motor continues to be energized to rotate in the forward direction as long as the key $13_{P6}$ remains on. When the key $13_{P6}$ is turned off, the motor ceases to be energized for rotation in the forward direction, and the light emitting diode corresponding to that key is deenergized. On the other hand, when the key $13_{P7}$ is turned on, the light emitting diode which corresponds to this key is maintained illuminated only during the time this key remains on, and the motor specified by the data stored in the register 11 is energized to rotate in the reverse direction. If the motor M1 is energized, the limit switch $LS_{hi}$ is monitored until it is turned on, whereupon the rotation in the reverse direction is interrupted and the counter CO1 is cleared. Otherwise the rotation in the reverse direction is continued as long as the key $13_{P7}$ remains on. Thus it will be seen that the keys $13t_1$ to $13t_4$ are utilized to specify one of the motors M1 to M5 or the attitude controlling mechanisms 100 to 500 while the depression of the keys $13_{P6}$ and $13_{P7}$ permits an arbitrary adjustment of the position of the respective mechanisms. When the key $13_{P6}$ or $13_{P7}$ is turned off, the counts in the counters CO1 to CO5 are stored in the non-volatile memory 9.

Referring to the left-hand branch of the flowchart shown in FIG. 8b to describe the registration of an identification code, the depression of the key $13_{P2}$, "PROGRAM" by the driver causes the microcomputer to reset the storage of the on condition of other keys $13_{P1}$, $13_{P3}$ to $13_{P5}$ and to terminate the latching of the illuminated condition of their associated light emitting diodes, and causes it to store the on condition of the key $13_{P1}$ and to latch its associated light emitting diode in its illuminated condition. The microcomputer then checks if there is attitude data in the non-volatile memories 8–3, and if it finds that no attitude data is present, it indicates the memory number in which no attitude data is present on the first to the sixth digit of the display $13_{CD}$. If attitude data is absent in either one of the non-volatile memories 8–3, "E" and "P" are displayed on the seventh and the eighth digit, respectively. If all of the non-volatile memories 8–3 contain attitude data, the numerals 8 to 3 are successively displayed on the first to the sixth digit, and "F" and "P" are displayed on the seventh and the eighth digit, respectively. The microcomputer then waits for the ten keys $13t_1$ to $13t_8$ to be turned on. When they are turned on, the display is cleared while the number of the inputted key is displayed. Representing the number of the inputted key as "1," the prevailing count code in the counters CO1 to CO5 is stored as attitude data in the non-volatile memory "1."

Finally, referring to the right-hand branch of the flowchart shown in FIG. 8a, an automatic establishment of an attitude in response to the key-in of an identification code will be described. When the driver depresses one of the keys $13t_1$ to $13t_5$ in the key input standby condition (initialized condition), the microcomputer displays the number of one of the ten keys on the display $13_{CD}$. Representing the number of the key depressed by "i," the attitude data stored in the non-volatile memory "i" is written into the register 9, subsequently waiting for the depression of the key 13$p_3$ "SET." When the key 13$p_3$ is depressed, each code of the data stored in the non-volatile memory 9 is sequentially compared against each code of the target data stored in the register 9, thus sequentially controlling the energization of the motors M1 to M5 of the mechanisms 100 to 500. When the attitude is established in this manner, the count code in the counters CO1 to CO5 is stored in the non-volatile memory 9, and the microcomputer returns to the initialization.

From the foregoing description it will be seen that the described arrangement permits the driver to achieve an automatic establishment of a standard attitude by initially inputting his stature and to adjust the attitude as required by a key operation. The driver can then input his identification code key (1-8) to register the corresponding attitude data into one of the non-volatile memories 1-8. The driver is subsequently enabled to reestablish the registered attitude by a mere depression of his identification code key even after the power supply to the operating board has been once interrupted and then turned on again. Since the initial establishment of the attitude takes place in response to only the inputting of stature data which is standardized, no convenience is experienced. Subsequently, the attitude can be adjusted to his preference by a key operation. If the driver then registers his attitude data, a one-touch key action is all that is required subsequently in order to establish the same attitude automatically.

It will be noted that the manual adjustment can be achieved by means other than a key operation. By way of example, the motor controlling circuit MD may be directly coupled with a forward/reverse control switch, which may be manually operated to achieve the manual adjustment.

What is claimed is:

1. Attitude control system for driver's seat comprising:
   seat attitude setting means;
   driving means adapted to drive the seat attitude setting means;
   signal generator means coupled to the seat attitude setting means for generating an electric pulse for each movement of the seat attitude setting means;
   a plurality of key switches;
   a character display; and
   an electronic control device comprising electronic processor means and memory means including a read only memory, a read-write memory and a non-volatile, read-write memory, said memory means storing standard attitude data corresponding to human data indicative of the physical features of a driver,
   said electronic control device being capable of reading standard attitude data which corresponds to the human data inputted with the key switches from the memory means and controlling the energization of the driving means for establishing an attitude indicated by the read-out standard attitude data with reference to actual attitude data based on the counting of electric pulses,
   said electronic control device storing acutal attitude data at a predetermined address of the non-volatile, read-write memory when an identification code and a memory instruction are inputted by the key switches, said address corresponds to the identification code inputted,
   said electronic control device being responsive to input of an identification code and a set instruction with the key switches, reading the attitude data at the address which corresponds to the inputted identification code, controlling the energization of the driving means for establishing an attitude indicated by the attitude data corresponding to the inputted identification code with reference to the actual attitude data based on the counting of the electric pulses, and
   said electronic control device, during the energization of the driving means, forming the actual attitude data by counting up or down the electric pulses depending on the drive direction of the seat attitude setting means and storing the actual attitude data in the non-volatile, read-write memory as the current attitude data after it stops the energization of the driving means.

2. Attitude control system according to claim 1 wherein the electronic control device energizes the driving means in a direction which corresponds to a key switch operation as long as the key switch is maintained operated.

3. Attitude control system according to claim 1, wherein the electronic control device includes up/down counter means which counts up or down the electric pulses corresponding to the drive direction of the driving means.

4. Attitude control system according to claim 1, further including limit position detecting means coupled to the seat attitude setting means.

5. Attitude control system according to claim 4, wherein the electronic control device stops energization of the driving means when the limit position detecting means detects the seat attitude setting means is at a limit position.

6. Attitude control system according to claim 4, wherein the electronic control device sets the actual data to a predetermined one when the limit position detecting means detects the seat attitude setting means is at a limit position.

7. Attitude control system according to claim 1, further including limit position detecting means coupled to the seat attitude setting means, the electronic control device including up/down counter means which counts up or down the electric pulses corresponding to the drive direction of the driving means, and the electric control device setting the counter to a predetermined data output condition when the limit position detecting means detects the seat attitude setting means is at a limit position.

* * * * *